(12) United States Patent
Toppani

(10) Patent No.: US 6,715,815 B2
(45) Date of Patent: Apr. 6, 2004

(54) GLOVE COMPARTMENT FOR AN AUTOMOBILE

(75) Inventor: Nicolas Toppani, Villastellone (IT)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/962,856

(22) Filed: Sep. 25, 2001

(65) Prior Publication Data

US 2002/0084666 A1 Jul. 4, 2002

(30) Foreign Application Priority Data

Sep. 26, 2000 (FR) .............................................. 00 12189

(51) Int. Cl.$^7$ ................................................. B60R 7/06
(52) U.S. Cl. .................................................... 296/37.12
(58) Field of Search ........................... 296/37.12, 37.13, 296/37.8

(56) References Cited

U.S. PATENT DOCUMENTS

| | | | | |
|---|---|---|---|---|
| 3,586,091 | A | * | 6/1971 | Roberts |
| 4,355,837 | A | * | 10/1982 | Shimizu et al. |
| 5,143,265 | A | * | 9/1992 | Schultz |
| 5,197,775 | A | * | 3/1993 | Reeber |
| 6,231,099 | B1 | * | 5/2001 | Greenwald |

* cited by examiner

*Primary Examiner*—Jason Morrow
(74) *Attorney, Agent, or Firm*—Harrison & Egbert

(57) ABSTRACT

A glove compartment, in particular for a motor vehicle. The glove compartment includes a main body (2), defining the global volume of the glove compartment (1); modulatable arrangement mechanism (3), being removable and enabling the inner space (4) of said main body (1) to be adapted as required; and frontal opener in two parts (5 and 6) of the front face of the body (1), giving access to the inner space (4) according to the arrangement chosen and its contents (7).

7 Claims, 3 Drawing Sheets

GLOVE COMPARTMENT FOR AN AUTOMOBILE

BACKGROUND OF THE INVENTION

1. Field of the Invention

The present invention relates to a glove compartment, in particular for a motor vehicle, designed to receive, for example, various objects, such as road maps, books, pocket lamps, mobile telephones, boxes of medicaments, glasses, etc.

2. Description of Related Art

The contents of this type of glove compartment depends, in fact, on each individual person, and on his or her personality and lifestyle. Such glove compartments, as they are presently known, cannot be adapted to each type of person or, more precisely, to the way this person uses his or her vehicle.

For instance, the glove compartment of a family vehicle will be used in a different way from that of a company car or the vehicle of a sales representative, or again, that of a vehicle intended basically for leisure activities.

BRIEF SUMMARY OF THE INVENTION

The invention relates to a glove compartment that can be adapted according to the use to which the vehicle is put, the internal space of which is capable of being arranged and the opening of which can be adapted to this space, as well as its environment.

For this purpose, the invention provides a glove compartment, in particular for a motor vehicle, characterised in that it has:

a main body, defining the global volume of the glove compartment;

means of modulatable arrangement, which are removable, enabling the internal space of said main body to be adapted as required.

means of frontal opening in two parts of the front face of said body, giving access to the internal space according to the chosen arrangement and its contents.

The present invention also relates to the characteristics that will emerge in the course of the description that follows, and which are to be considered in isolation or in all their possible technical combinations.

BRIEF DESCRIPTION OF THE SEVERAL VIEWS OF THE DRAWINGS

This description, which is given by way of a non-restrictive example, will permit a better understanding of the way in which the invention can be implemented, with reference to the annexed drawings.

DETAILED DESCRIPTION OF THE INVENTION

Figure 1:
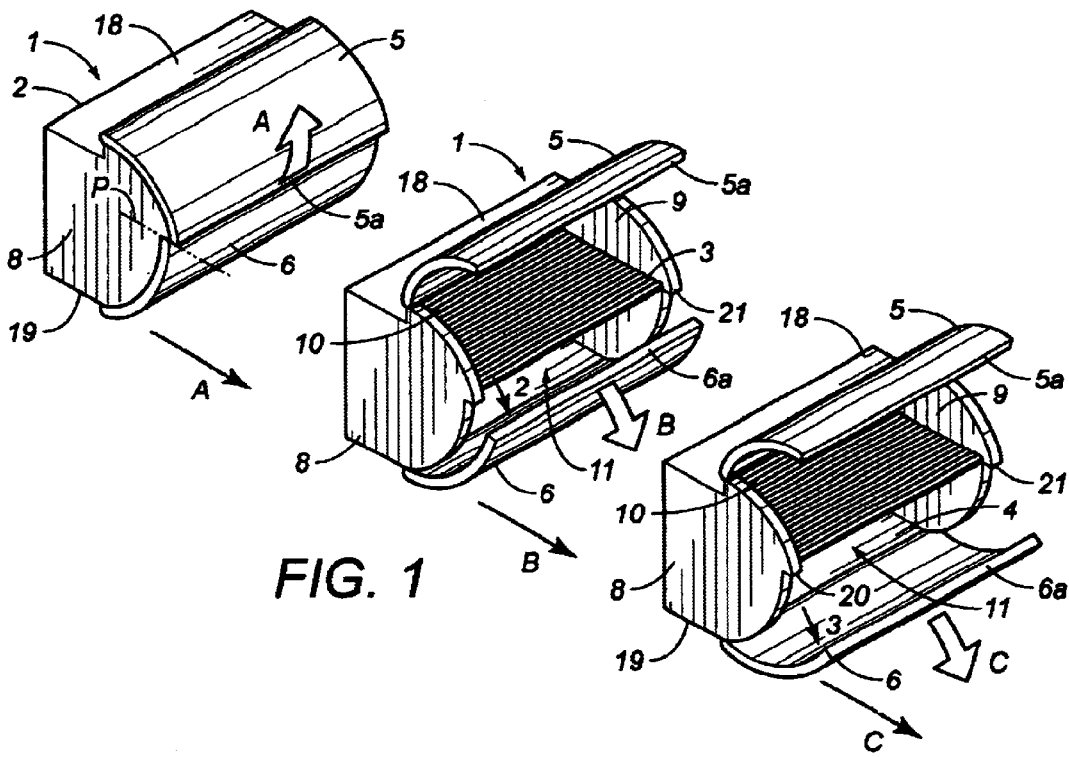
FIG. 1 is a perspective view of a glove compartment, according to the invention, in closed, semi-open, and fully open positions successively.

The glove compartment 1, generally designated in the figures, includes:

a main body 2, defining the global volume of glove compartment 1;

modulatable arrangement means 3, which are removable, enabling the internal space 4 of said main body 1 to be adapted as required, frontal opening means, in two parts, 5 and 6, of the front face of said body 1, giving access to internal space 4 according to the arrangement chosen and its contents 7a, 7b, 7c, 7d, 7e, 7f, 7g, 7h, etc.

According to the present exemplary embodiment, modulatable arrangement means 3 are constituted by a removable shelf or panel.

This panel constitutes a support plane and co-operates with two lateral walk, 8 and 9, of main body 1, to be positioned as required in the glove compartment.

Panel 3 is, in fact, capable of defining, as shown in FIG. 1, a double compartment, one being an upper compartment 10, and the other a lower compartment 11, when it is disposed substantially horizontally in space 4.

Figure 2:
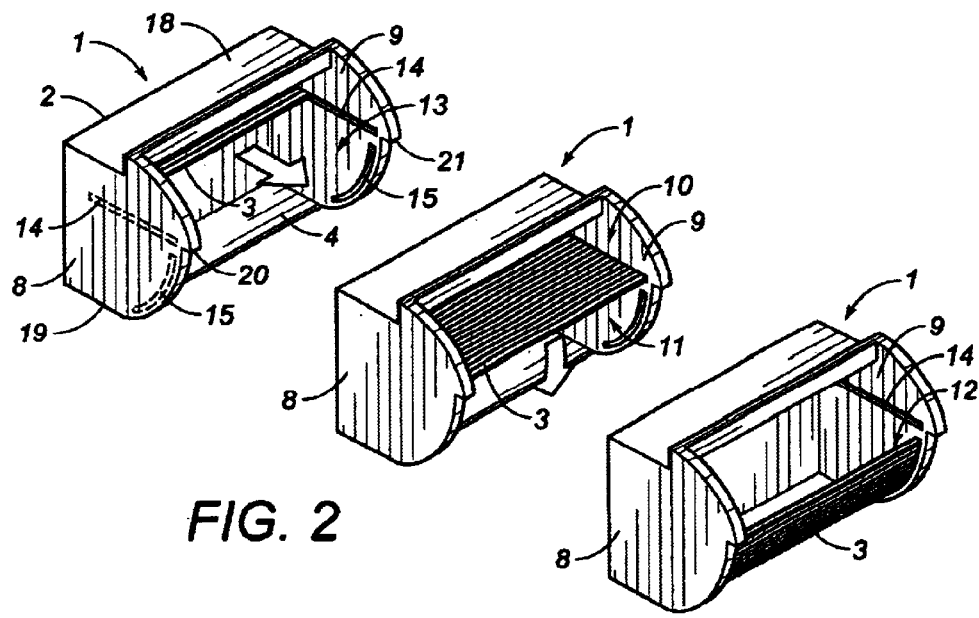
FIG. 2 is a perspective view of a glove compartment according to FIG. 1, front which the closing means have been removed, to permit a better understanding of the modulatable arrangement means, three possibilities being illustrated.

Furthermore, as shown in FIG. 2, it is also capable of defining a bin 12, when it is disposed substantially vertically in the front lower portion of space 4.

Figure 7:
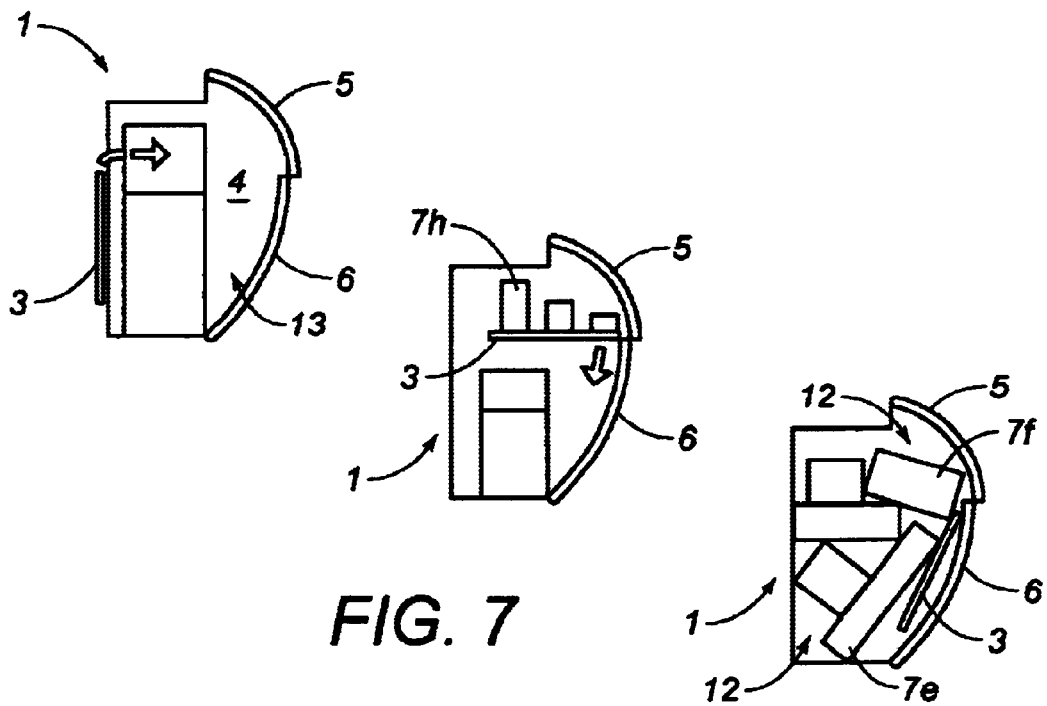
FIG. 7 is a schematic view of three possibilities of arrangement and use of a glove compartment according to the invention.
Figure 8:
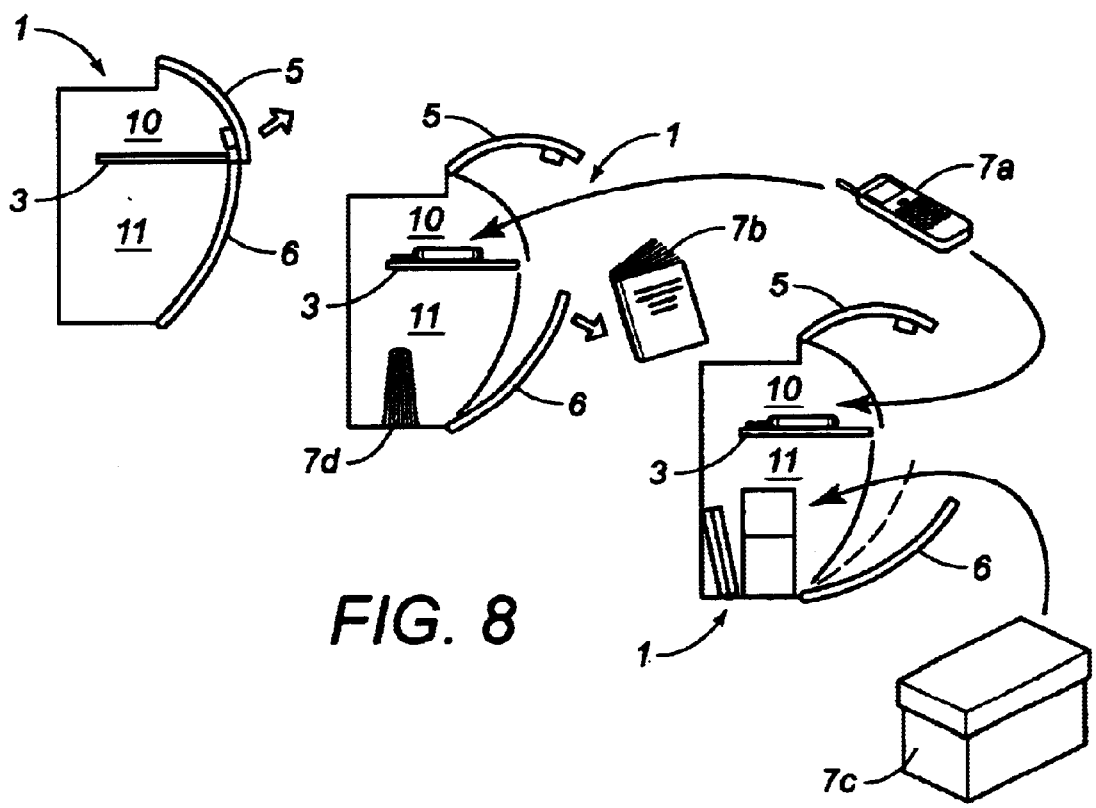
FIG. 8 is a schematic view of the glove compartment of the invention according to the three possibilities of opening.

Finally, said panel 3 is also capable of defining a single volume 13, in particular freely accessible, over the entire frontal height of space 4, when it is retracted into an inner portion of main body 1, as shown in FIGS. 2 and 7.

According to the present exemplary embodiment, panel 3 is positioned in space 4 via a set of grooves 14 and 16, provided in the area of lateral walls 8, 9 of the main body, and, in particular, produced symmetrically In pairs on either side of said lateral walls 8 and 9.

Grooves 14, 15 thus co-operate with the ends of removable panel 3 to provide the different arrangement variants.

For example, in the case of one of the pairs of grooves, 14, these are provided horizontally, whereas, in that of the other pair of grooves, 15, these are provided substantially vertically, in fact slightly inclined, according to the present example, to allow for the shape of the front lower portion of main body 1.

The dimensions of said grooves 14 and 15 correspond to those of the respective ends of panel 3.

Figure 3:
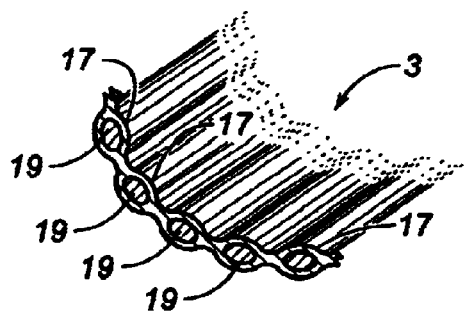
FIG. 3 is a detailed cross-sectional view of said arrangement means.
Figure 4:
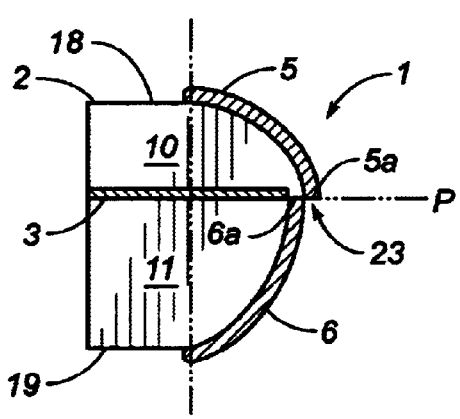
FIGS. 4, 5 and 6 are transverse cross-sectional views of a glove compartment according to FIGS. 1 to 3, in closed, semi-open and fully open positions.

According to one exemplary embodiment, shown in FIG. 3, panel 3 is constituted by a flexible structure. It is formed in particular of rigid, elongate members 15, 16, particularly in the form of rods, bars, strips or the like, interconnected by over-moulding a flexible material 17, forming between said members a hinge or similar means, so as to impart to said panel 3 characteristics of flexibility enabling it to change over from one position to another, according to predetermined radii of curvature, as shown in FIG. 2, with all this taking place noiselessly.

As to the opening means of the front face of main body 1, these are constituted by two doors, 5 and 6, one of which, 5, is hinged on an upper wall 18 of said body 1 to give access to an upper area 10 of space 4.

The other door, 6, is, for its part, hinged on a lower wall 19 of said body 1 to give access to a lower area, 11, of space 4.

Free ends 5a and 6a of the two doors 5 and 6 are located on the same plane P, in particular a horizontal one, to ensure closure of space 4.

This is what particularly differentiates the type of opening according to the invention from the known conventional opening systems, while, at the same time, ensuring that the glove compartment does not open in the event of an airbag device being triggered.

According to another characteristic of the invention, upper door 5 and lower door 6 are held in closed or open position by a system of leaf springs 100 positioned on their respective axes of rotation.

As shown in FIGS. 1 and 2, doors 5 and 6 are interconnected when closed by their free end edges 6a and 6a. One of the free end edges 5a, 6a, here edge 6a, is housed beneath shoulders 20 and 21 of lateral sides 8 and 9 of body 1, lying back inwards of the free end edge, here 6a, of upper door 6, which overlies it to retain it in closed position. Such an arrangement can be reversed.

As shown in FIG. 1, a first opening A of the lower door is obtained in a first stage X by raising upper door 5. The latter is able to release lower door 6, which can then tip, being pulled down by its own weight, creating a second opening in a second stage, B, until it encounters a point of friction. The lower door can then be opened completely in a third stage, C, by acting directly on the door and by forcing past said point of friction. Full opening is then obtained.

The raising of upper door 5, which causes lower door 6 to tip into said first open position, is obtained via a gripping area 23, constituted, here, substantially by the overlap between upper door 5 and lower door 6.

Such a system makes it possible to dispense with the conventional opening sub-assembly consisting of a handle, a transfer means and a pulling means, and to ensure that the glove compartment does not open in the event of the airbag module being triggered.

Furthermore, the aforementioned overlap of upper door 5 and lower door 6 gives a styling line concealing areas of play and profiles.

Figure 5:
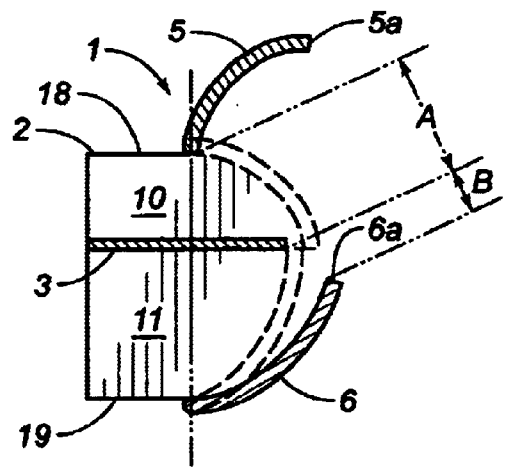

According to the invention, it is possible, in fact, to obtain a glove compartment offering, as illustrated in FIG. 5, full access to compartment 10 when the panel is in horizontal position, and so-called "letterbox" type access when lower door 6 is not fully open.

Figure 6:
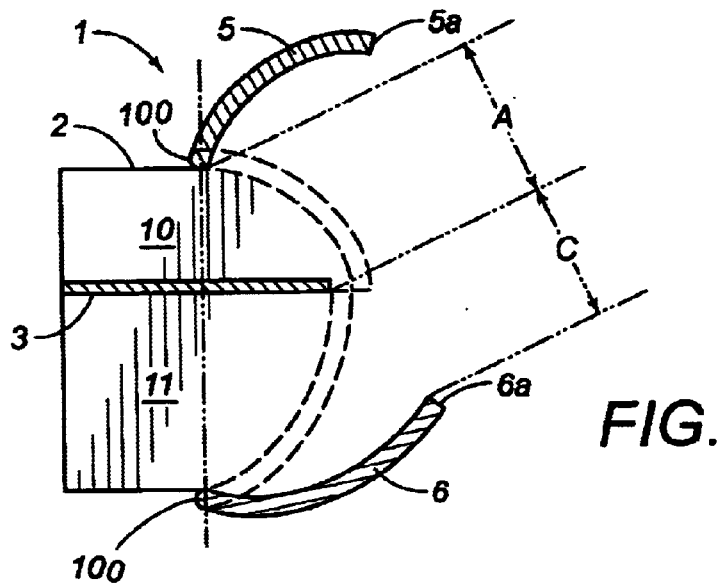

As shown in FIG. 6, the full opening of said lower door 6 not only gives full access to upper compartment 10 when the panel is horizontal, but also full access to lower compartment 11.

Furthermore, the glove compartment according to the invention can include means for fixing it to the body of the dashboard so as io enable it to be put into place and removed quickly in relation to said body. It will thus be easy to change models.

I claim:

1. A glove compartment for use in a motor vehicle comprising:
    a main body defining an interior volume therein, said main body having a first lateral wall at one end of said interior volume and a second lateral wall at an opposite end of said interior volume;
    a modulatable arrangement removably positioned within said interior volume of said main body, said modulatable arrangement being a panel defining a support plane cooperative with said first and second lateral walls of said main body so as to define one of a double compartment, a bin, and a single volume within said interior volume of said main body, said double compartment defining an upper compartment and a lower compartment when said panel is positioned substantially horizontally in said interior volume, said panel being positioned substantially vertically in a lower front portion of said interior volume so as to define said bin, said panel being positioned in a inner portion of said interior volume of said main body so as to define said single volume over an entire frontal height of said interior volume, said panel being suitably flexible so as to be movable from one position to another within said interior volume of said main body; and
    a means formed at a front face of said body for providing access to said interior volume, said means having a first part and a second part.

2. The glove compartment of claim 1, each of said first and second lateral walls having a first groove and a second groove, said first and second grooves being cooperative with respective ends of said panel so as to position said panel in said interior volume.

3. The glove compartment of claim 1, said panel comprising a plurality of elongate rigid members interconnected by an over-molding of a flexible material.

4. The glove compartment of claim 1, said first part of said means being a first door, said second part of said means being a second door, said first door being hingedly connected to an upper wall of said main body so as to allow access to an upper area of said interior volume, said second door being hingedly connected to a lower area of said interior volume, each of said first and second doors having a free end located in a common horizontal plane when closed over said interior volume.

5. The glove compartment of claim 4, each of said first door and said second door having a leaf spring at an axis of rotation thereof.

6. The glove compartment of claim 4, said first and second doors being interconnected at the free ends thereof when in the closed position, each of said first and second lateral walls having a shoulder formed therein, the free end of said second door residing under the shoulder when in the closed position, the free end of the said second door residing inwardly of the free end of said first door when in the closed position.

7. The glove compartment of claim 6, said second door being releasable by a weight thereof from the shoulders of said first and second lateral walls when said first door is raised upwardly so as to define a first opening position, said second door being movable downwardly so as to define a second opening position, said second door being retained by friction in said first opening position.

* * * * *